(12) United States Patent
Johnson et al.

(10) Patent No.: US 7,650,395 B2
(45) Date of Patent: Jan. 19, 2010

(54) NETWORK CONNECTIVITY MANAGEMENT

(75) Inventors: James S Johnson, Sammamish, WA (US); Brian J Ewanchuk, Redmond, WA (US); Christopher R H Sires, Everett, WA (US); Justin W Hartin, Bellevue, WA (US); Anthony L Willie, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 11/084,052

(22) Filed: Mar. 18, 2005

(65) Prior Publication Data
US 2006/0224709 A1    Oct. 5, 2006

(51) Int. Cl.
*G06F 15/177* (2006.01)
*G06F 15/173* (2006.01)
*G06F 15/16* (2006.01)
(52) U.S. Cl. .................. 709/220; 709/223; 709/227
(58) Field of Classification Search ............... 709/220, 709/223, 227, 230
See application file for complete search history.

(56) References Cited

U.S. PATENT DOCUMENTS

2002/0120731 A1 * 8/2002 Walker et al. ............... 709/223

* cited by examiner

*Primary Examiner*—Vivek Srivastava
*Assistant Examiner*—Tanim Hossain
(74) *Attorney, Agent, or Firm*—Lee & Hayes, PLLC (57) ABSTRACT

Network connectivity management can manage (e.g., harmonize) network connectivity services and network connectivity modules. By way of example only, network connectivity management is applicable to connections to a network through a network connectivity service via a network connectivity module. In a described implementation, network connectivity configuration information is scanned to locate data that corresponds to a preferred network connectivity service for a given connection scenario. The network connectivity module used in the given connection scenario is extracted. It is detected if the extracted network connectivity module is a preferred network connectivity module that is associated with the preferred network connectivity service. If not, the connection scenario can be redirected away from the non-preferred network connectivity module and toward the preferred network connectivity module. A user may optionally be given an opportunity to elect to connect via the preferred network connectivity module.

6 Claims, 6 Drawing Sheets

NETWORK CONNECTIVITY MANAGEMENT

TECHNICAL FIELD

This disclosure relates in general to network connectivity and in particular, by way of example but not limitation, to enhancing network connectivity by enabling network connectivity management.

BACKGROUND

Most people access the Internet through an internet service provider (ISP) of some kind. Many ISPs provide specialized propriety software for use when accessing the Internet through the ISP. For example, a particular ISP often provides each customer with a particular software module that is to be launched when the customer is connecting to the Internet through the particular ISP. The particular software module usually includes capabilities and/or features to enhance the connection experience for the user when connecting to the Internet through the particular ISP.

However, users can often incidentally or intentionally begin connecting to the Internet through the particular ISP via another software module that is not produced by the particular ISP. The other software module may be produced, for example, by a third party. Unfortunately, the other software module from the third party usually does not include any capabilities and/or features to enhance the connection experience for the user. Moreover, use of such third-party software modules prevents the particular ISP from ensuring a consistent connection experience for all users.

Accordingly, there is a need for schemes, mechanisms, techniques, etc. that can facilitate the provisioning of a consistent user experience and/or enhanced features and capabilities for users connecting to a network through a network connectivity service such as an ISP.

SUMMARY

Network connectivity management can manage (e.g., harmonize) network connectivity services and network connectivity modules. By way of example only, network connectivity management is applicable to connections to a network through a network connectivity service via a network connectivity module. In a described implementation, network connectivity configuration information is scanned to locate data that corresponds to a preferred network connectivity service for a given connection scenario. The network connectivity module used in the given connection scenario is extracted. It is detected if the extracted network connectivity module is a preferred network connectivity module that is associated with the preferred network connectivity service. If not, the connection scenario can be redirected away from the non-preferred network connectivity module and toward the preferred network connectivity module. A user may optionally be given an opportunity to elect to connect via the preferred network connectivity module.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Users connecting to the internet today often use third party connectivity software that is a default connectivity module included in an operating system or one that is provided by an independent vendor. Unfortunately, a third party connectivity module may not be optimized for the user, and the user is frequently reluctant to switch to and/or skeptical of new connectivity software.

In a described implementation, a user's system is scanned to detect connectivity points. For each relevant connectivity point that is detected, a redirect to a different connectivity software module that is enhanced for the user is injected. In a specific example, a component scans the system searching for remote access application programming interfaces (APIs) of a specific type (e.g., those of a previous version of a connectivity module, a third party connectivity module, etc.). For each specific type of remote API that is found, the component injects a redirection link to the connectivity point to enable the user to select a preferred connectivity module, especially when connecting to a network through an associated preferred network connectivity service (NCS).

To facilitate understanding, this description is separated into three sections. A first section references FIGS. 1-3 and is entitled "General Example Implementations for Network Connectivity Management". A second section references FIGS. 4-5 and is entitled "Specific Example Implementations for Network Connectivity Management". There is also a third section that references FIG. 6 and is entitled "Example Operating Environment for Computer or Other Device".

General Example Implementations for Network Connectivity Management

Figure 1:
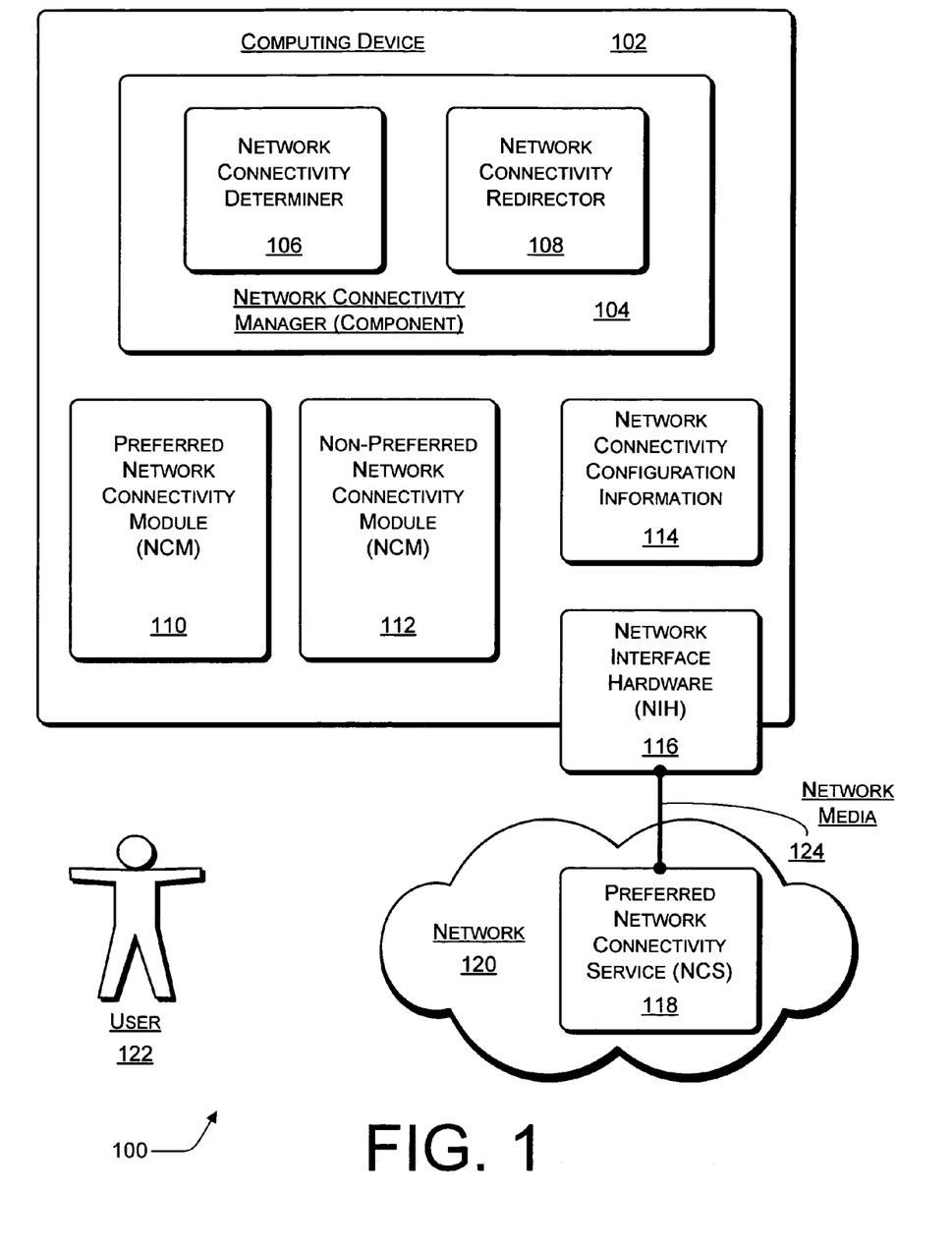
FIG. 1 is a block diagram example of a network connectivity management paradigm.

FIG. 1 is a block diagram example of a network connectivity management paradigm 100. Network connectivity management paradigm 100 includes a user 122, a computing device 102, and a network 120. Using computing device 102, user 122 is enabled to access network 120 over network media 124 through a network connectivity service (NCS) such as preferred NCS 118.

As illustrated, computing device 102 includes a network connectivity manager (component) 104, network connectivity configuration information 114, network interface hardware (NIH) 116, and one or more network connectivity modules (NCMs) 110 and 112. An example of network connectivity configuration information 114 is described further herein below with particular reference to FIG. 2.

Network connectivity manager 104 includes a network connectivity determiner 106 and a network connectivity redirector 108. Network connectivity manager 104, and the components thereof, may be considered executable logic comprising hardware, software, firmware, or some combination thereof. Network connectivity manager 104 is adapted to manage network connectivity by, for example, harmonizing (e.g., effectuating agreement, accord, and/or consonance between) an NCM and an NCS. When network connectivity manager 104 is acting to enhance the network connectivity experience, computing device 102 includes at least a preferred NCM 110 and a non-preferred NCM 112.

Network 120 may be any network or combination of networks that is operating in accordance with one or more protocols. Examples of network 120 include an internet, a virtual private network (VPN), a wireless and/or wired network, a local area network (LAN), a wide area network (WAN), some other public or private network(s), some combination thereof, and so forth. An NCS provides and enables a connection to network 120. Preferred NCS 118 is associated with a preferred NCM 110. By way of example only, when network 120 comprises an internet, preferred NCS 118 may comprise an ISP. Also, if user 122 is connecting to network 120 with a dial-up connection, preferred NCM 110 may comprise dial-up networking (DUN) connectivity software.

Network 120 is accessed through preferred NCS 118 over one or more network media 124. Network media 124 may be any kind of wireless or wired media or a combination thereof. Consequently, NIH 116 may be capable of interacting with preferred NCS 118 over any kind of wireless or wired media or a combination of both. NIH 116 may thus be a network interface card or adapter, a modem, a configurable or dedicated device, some combination thereof, and so forth. Also, NIH 116 may be capable of communicating over a wired and/or wireless network media 124.

When a user 122 wishes to connect to network 120 through preferred NCS 118, user 122 activates or launches an NCM. For example, user 122 might launch non-preferred NCM 112. Non-preferred NCM 112 may be (i) a third party NCM that is included with an operating system of computing device 102 or that is produced by an independent vendor or (ii) an older version of an NCM that was previously produced by preferred NCS 118.

Preferred NCM 110, on the other hand, comprises an NCM that is currently preferred by preferred NCS 118. Preferred NCM 110 typically includes the latest features, capabilities, tunings, etc. to enhance the connection experience for user 122. Hence, the owners/operators of preferred NCS 118 often prefer that user 122 connect to network 120 through preferred NCS 118 via preferred NCM 110 instead of non-preferred NCM 112.

In a described implementation, network connectivity manager 104 manages (e.g., harmonizes) network connectivity by attempting to ensure that preferred NCS 118 is accessed via preferred NCM 110. In operation, network connectivity determiner 106 determines if user 122 and/or computing device 102 is connecting to network 120 through preferred NCS 118 via non-preferred NCM 112. If so, then an NCM-NCS mismatch has been determined to exist (e.g., has been detected).

To attempt to eliminate the detected mismatch, network connectivity redirector 108 redirects connection attempts with preferred NCS 118 that are initiated via non-preferred NCM 112. The redirection is effectuated to be away from non-preferred NCM 112 and toward preferred NCM 110. This redirection may be automatic or may be at the option of user 122. When the redirection is fully realized, access to network 120 through preferred NCS 118 is accomplished via preferred NCM 110 instead of non-preferred NCM 112. Additional general examples of mismatch determination and network connectivity redirection are described herein below with particular reference to FIGS. 2 and 3.

Figure 2:
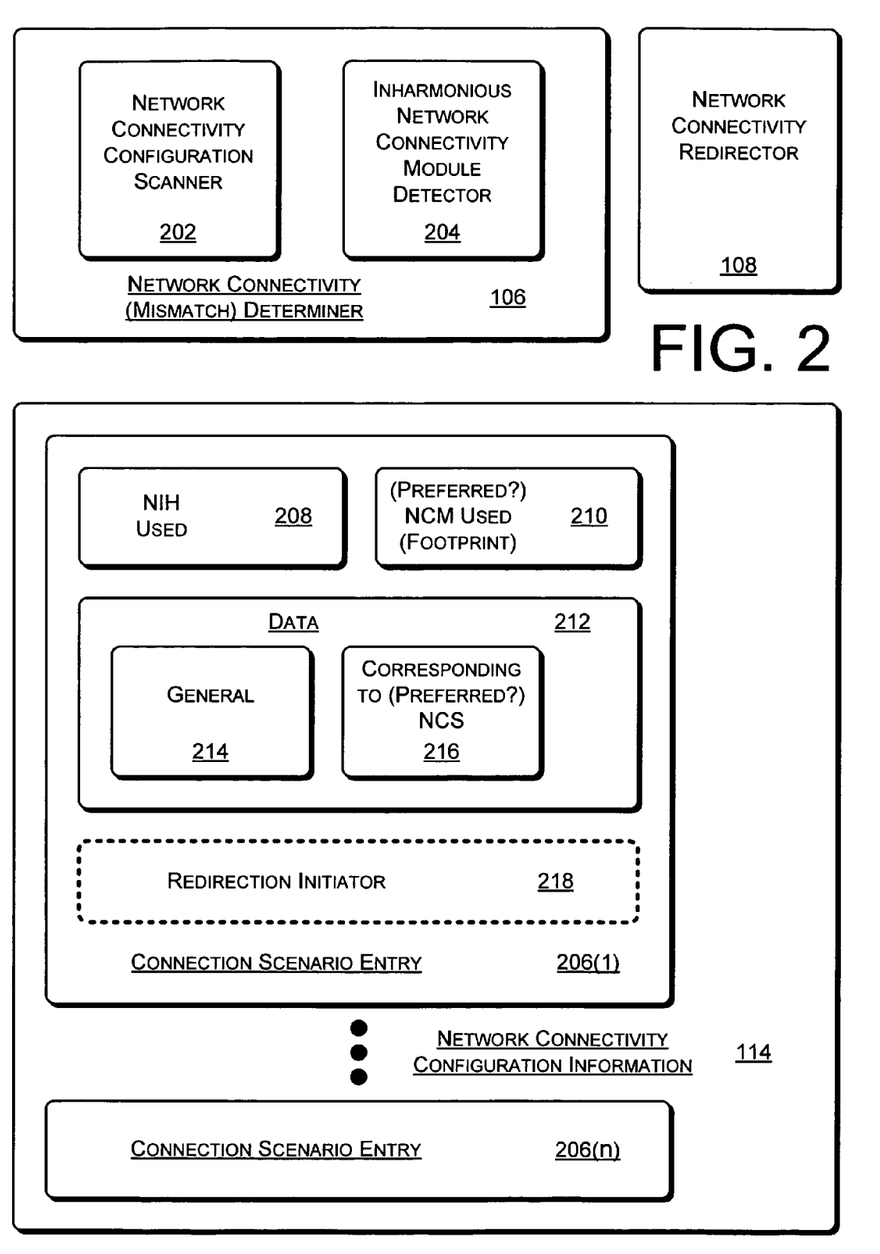
FIG. 2 is a block diagram example of network connectivity management in conjunction with network connectivity configuration information.

FIG. 2 is a block diagram example of network connectivity management in conjunction with network connectivity configuration information 114. As illustrated, network connectivity configuration information 114 includes multiple entries 206, each of which has one or more fields. Specifically, "n" connection scenario entries 206(1)...206(n) are shown. Each connection scenario entry 206 includes information relating to the NCM and the NIH that are used to establish a connection with an NCS.

Connection scenario entry 206(1) includes an NIH used field 208, a footprint of the NCM used field 210, and a data field 212. Data field 212 includes a general data field 214 and possibly another field 216 that contains data corresponding to the NCS through which a connection is established for the connection scenario of entry 206(1). If present, the data corresponding to the NCS 216 of the connection scenario of connection scenario entry 206(1) may comprise data corresponding to the preferred NCS. In this context, the preferred NCS comprises a preferred NCS 118 that is the predetermined focus of network connectivity determiner 106.

Generally, network connectivity mismatch determiner 106 determines when the NCM used (as indicated by NCM footprint field 210) fails to match with the data corresponding to the NCS that is being accessed (as indicated by field 216). Specifically, network connectivity determiner 106 determines if the connection scenario of entry 206(1) targets preferred NCS 118 by inspecting the data corresponding to NCS 216 and if the NCM used 210 to access the NCS is not the preferred NCM 110.

Examples of data corresponding to a given NCS are: credential data such as login identification (ID) (which is typically accompanied by a password), an email address or moniker, a name of an NCS realm, network access numbers (e.g., telephone dial-up or network address) that are links to the given NCS. Other examples of data corresponding to a given NCS are: telephony technology (e.g., tone versus pulse), dialing rules that accompany phone numbers, a network device name/type (e.g., a specific piece of hardware such as a modem or network card), IP configuration properties (e.g., DNS IP (primary and secondary), WINS IP (primary and secondary), static local IP, etc.), client media access control (MAC) address, server IP address(es), DNS entries, communications protocol type, access point identifier (e.g., a service set identifier (SSID)), a network name and/or NCS identifier, some combination thereof, and so forth. However, data corresponding to a given NCS 216 may exist, may be stored, and/or may be realized in other alternative manners.

In a described implementation, network connectivity determiner 106 includes a network connectivity configuration scanner 202 and an inharmonious network connectivity module detector 204. Network connectivity configuration scanner 202 is adapted to scan connection scenario entries 206 of network connectivity configuration information 114 to detect data 216 that corresponds to the preferred NCS 118. If data 216 corresponding to the preferred NCS 118 is discovered (e.g., located, found, etc.) at connection scenario entry 206(1), then inharmonious network connectivity module detector 204 operates.

Inharmonious network connectivity module detector 204 is adapted to extract from connection scenario entry 206(1) the footprint 210 of the NCM used in conjunction with the preferred NCS 118. It detects if the NCM used of field 210 matches the preferred NCS 118. In other words, inharmonious network connectivity module detector 204 detects if the NCM used 210 is the preferred NCM 110. If the NCM used 210 matches the preferred NCM 110, no additional action(s) need be taken. If, on the other hand, the NCM used 210 is detected to not match the preferred NCM 110, network connectivity redirector 108 operates.

In response to the mismatched or inharmonious network connectivity detection, network connectivity redirector 108 injects (e.g., inserts, adds, etc.) a redirection initiator 218 into connection scenario entry 206(1). Redirection initiator 218 causes the connection scenario of entry 206(1) to be redirected (e.g., diverted, detoured, etc.) away from the mismatched non-preferred NCM 112. In fact, redirection initiator 218 can cause the connection scenario of entry 206(1) to be redirected toward the preferred NCM 110. (It should be noted that network connectivity redirector 108 can alternatively operate so as to redirect the NCM that is used 210 to a different NCS (e.g., an NCS that matches the NCM used 210) when a mismatch is detected in a connection scenario entry 206.)

The redirection of redirection initiator 218 may be implemented in many possible manners. For example, the redirection to preferred NCM 110 may occur automatically without input or control by user 122. Alternatively, the redirection to preferred NCM 110 may occur only if user 122 opts into (or fails to opt out of) the enhanced connection experience provided by the preferred NCM 110.

When user 122 is given a choice, the option may be presented with an appropriate user interface (UI) mechanism when user 122 next attempts to connect to a network through preferred NCS 118 via the non-preferred NCM 112. However, the scanning and detecting (as well as the injection of redirection initiator 218) may occur as a background process that is repetitively operating at a predetermined interval.

Generally, network connectivity configuration information 114 is created and maintained by the operating system of computing device 102. It may, however, be formed in another manner. For example, the multiple NCMs present on computing device 102 may jointly create and maintain network connectivity configuration information 114.

As illustrated, network connectivity configuration information 114 is organized or separated by individual connection scenarios. However, network connectivity configuration information 114 may be organized in many different alternative manners. For example, connection scenarios may be grouped by NCM used, by NIH used, by NCS accessed, some combination thereof, and so forth.

Figure 3:
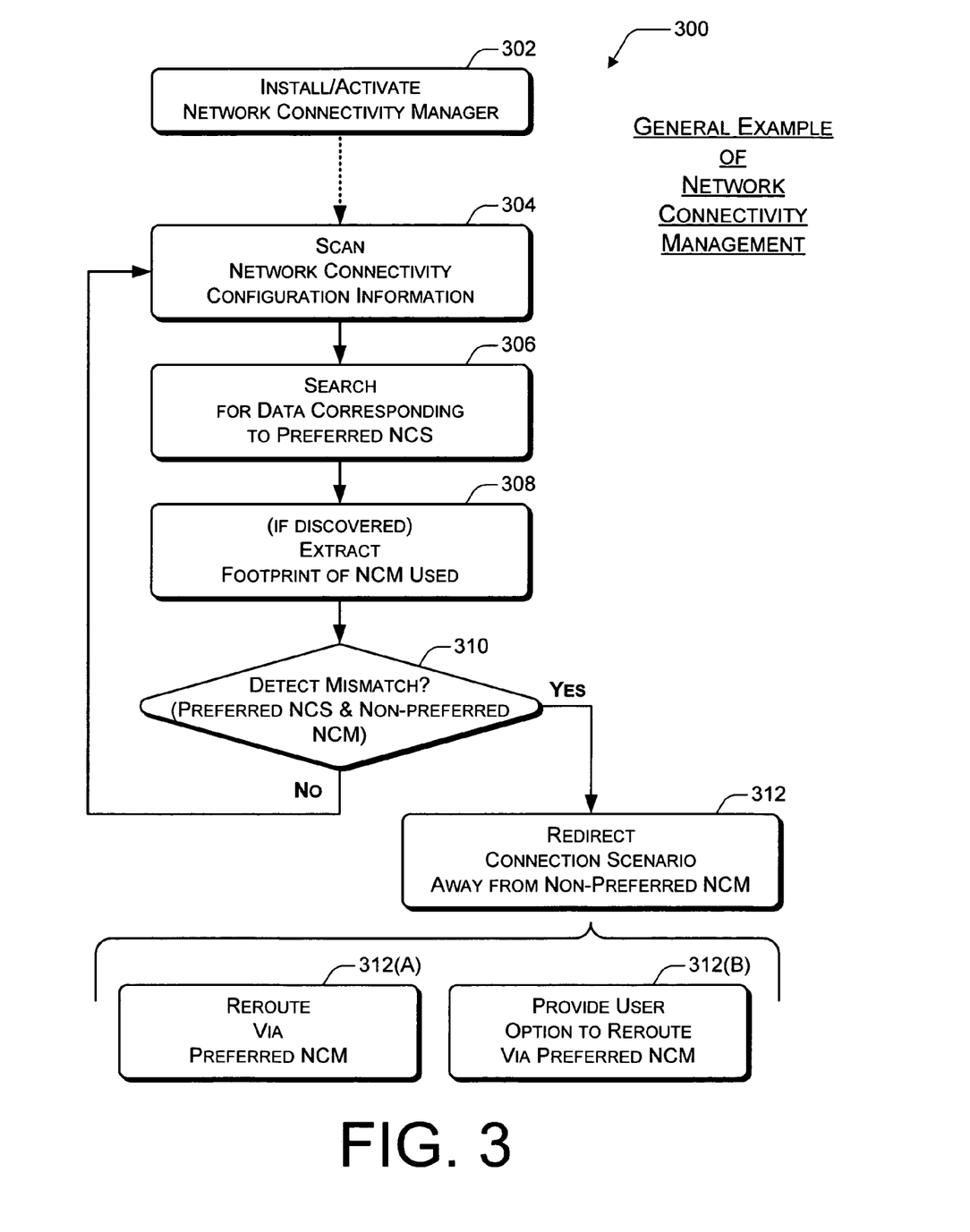
FIG. 3 is a flow diagram that illustrates a general example of a method for network connectivity management.

FIG. 3 is a flow diagram 300 that illustrates a general example of a method for network connectivity management. Flow diagram 300 includes six (6) "primary" blocks 302-312 and two (2) "secondary" blocks 312(A) and 312(B). Although the actions of flow diagram 300 may be performed in other environments and with a variety of hardware and software combinations, FIGS. 1 and 2 are used in particular to illustrate certain aspects and examples of the method. By way of example only, the actions of flow diagram 300 may be performed by a network connectivity manager component 104 in conjunction with network connectivity configuration information 114.

At block 302, a network connectivity manager is installed and/or activated. For example, when a computing device 102 is turned on, network connectivity manager 104 may be activated as a background process that proactively repeatedly performs the scanning at predetermined intervals. Alternatively, it may be activated whenever network connectivity configuration information 114 is accessed by an operating system to establish a new connection, when a connection through preferred NCS 118 is being established, and so forth.

At block 304, network connectivity configuration information is scanned. For example, network connectivity configuration information 114 may be scanned by a network connectivity configuration scanner 202 of a network connectivity determiner 106.

At block 306, data corresponding to a preferred NCS is searched for. For example, network connectivity configuration scanner 202 inspects data corresponding to a targeted NCS for each connection scenario entry 206 that is encountered in network connectivity configuration information 114 to ascertain if the targeted NCS is the preferred NCS 118.

When data corresponding to the preferred NCS is discovered (based on the searching at block 306), at block 308 the footprint of the NCM used is extracted. For example, inharmonious network connectivity module detector 204 may extract the NCM used from the footprint of the NCM used field 210 of the connection scenario entry 206 being analyzed.

The NCM used is compared to the preferred NCS to detect a mismatch (or match). Thus, at block 310, it is detected if there is a mismatch between the targeted NCS, which has been ascertained to be the preferred NCS, and the NCM being used to access the targeted NCS. If there is no mismatch, the method of flow diagram 300 repeats from block 304. If, on the other hand, the NCM used 210 to access the preferred NCS 118 is not the preferred NCM 110, then a mismatch is detected by inharmonious network connectivity module detector 204, and the method continues at block 312.

At block 312, the connection scenario is redirected away from the mismatched, non-preferred NCM. For example, network connectivity redirector 108 may inject a redirection initiator 218 into the connection scenario entry 206 having the detected inharmonious network connection scenario.

The redirection of block 312 may be implemented in multiple different manners. Two example alternatives are illustrated. At alternative block 312(A), the redirection causes the connection scenario to be rerouted through the preferred NCM. For example, redirection initiator 218 may cause the connection to network 120 through preferred NCS 118 to be routed via preferred NCM 110. At alternative block 312(B), the redirection causes an option to be presented to the user so that the user can elect to have the connection scenario rerouted via the enhanced, preferred NCM. An example implementation including a UI that provides such an option to user 122 is described further herein below with particular reference to FIG. 5.

Specific Example Implementations for Network Connectivity Management

The terminology used in the specific examples provided in this section pertain especially to a computing device that is functioning with a Microsoft® Windows® Operating System. However, the principles disclosed in this section and the referenced FIGS. 4 and 5 are applicable to general network connectivity management implementations.

Flow diagrams 400 and 500 include eight (8) blocks 402-416 and seven (7) blocks 502-514, respectively. Although the actions of flow diagrams 400 and 500 may be performed in other environments and with a variety of hardware and software combinations, FIGS. 1 and 2 are used in particular to illustrate certain aspects and examples of the method. Furthermore, terminology that pertains especially to the Microsoft® Windows® Operating System (e.g., API names) is used by way of example only.

Figure 4:
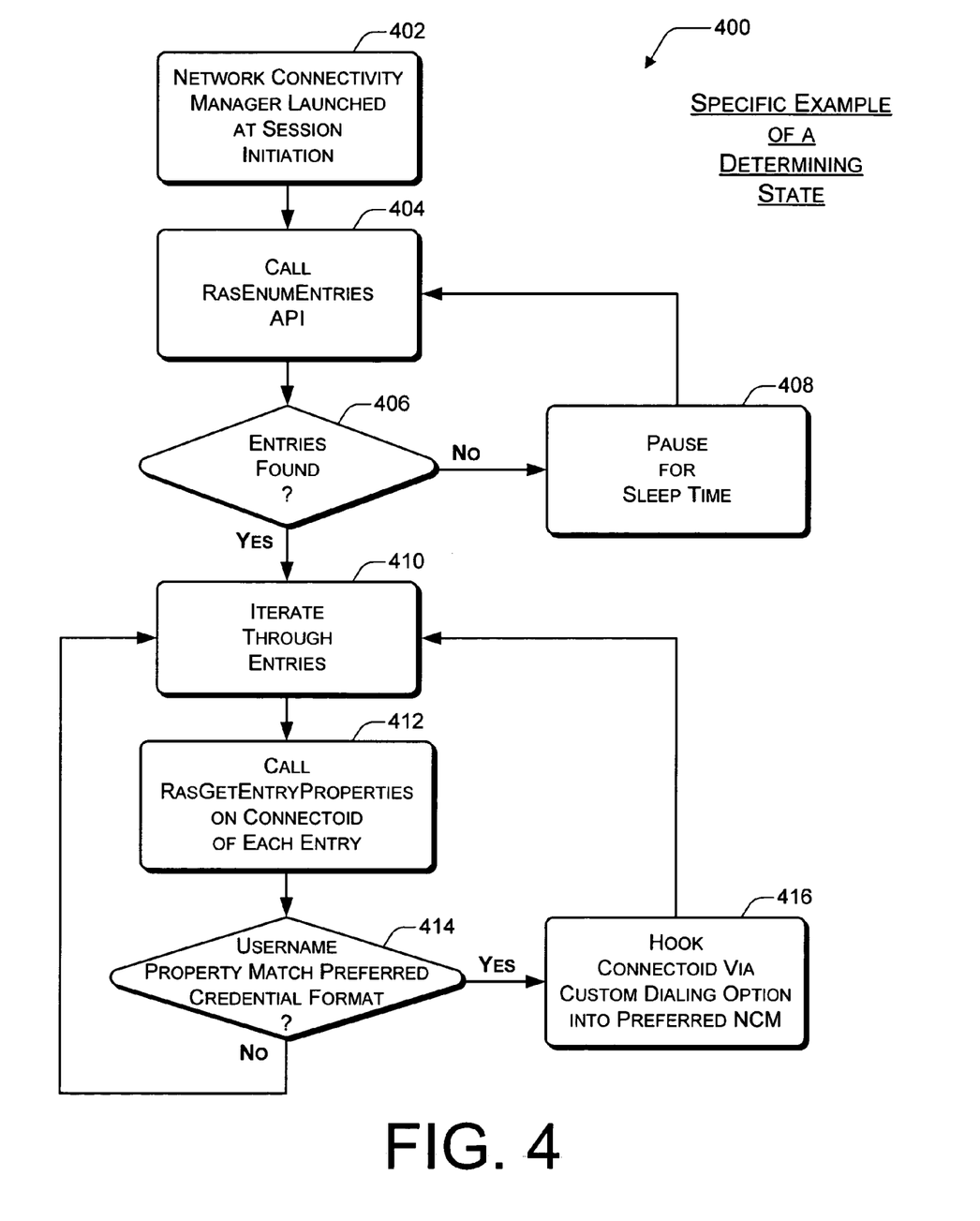
FIG. 4 is a flow diagram that illustrates a specific example of a method for a determining state of a management process.
Figure 5:
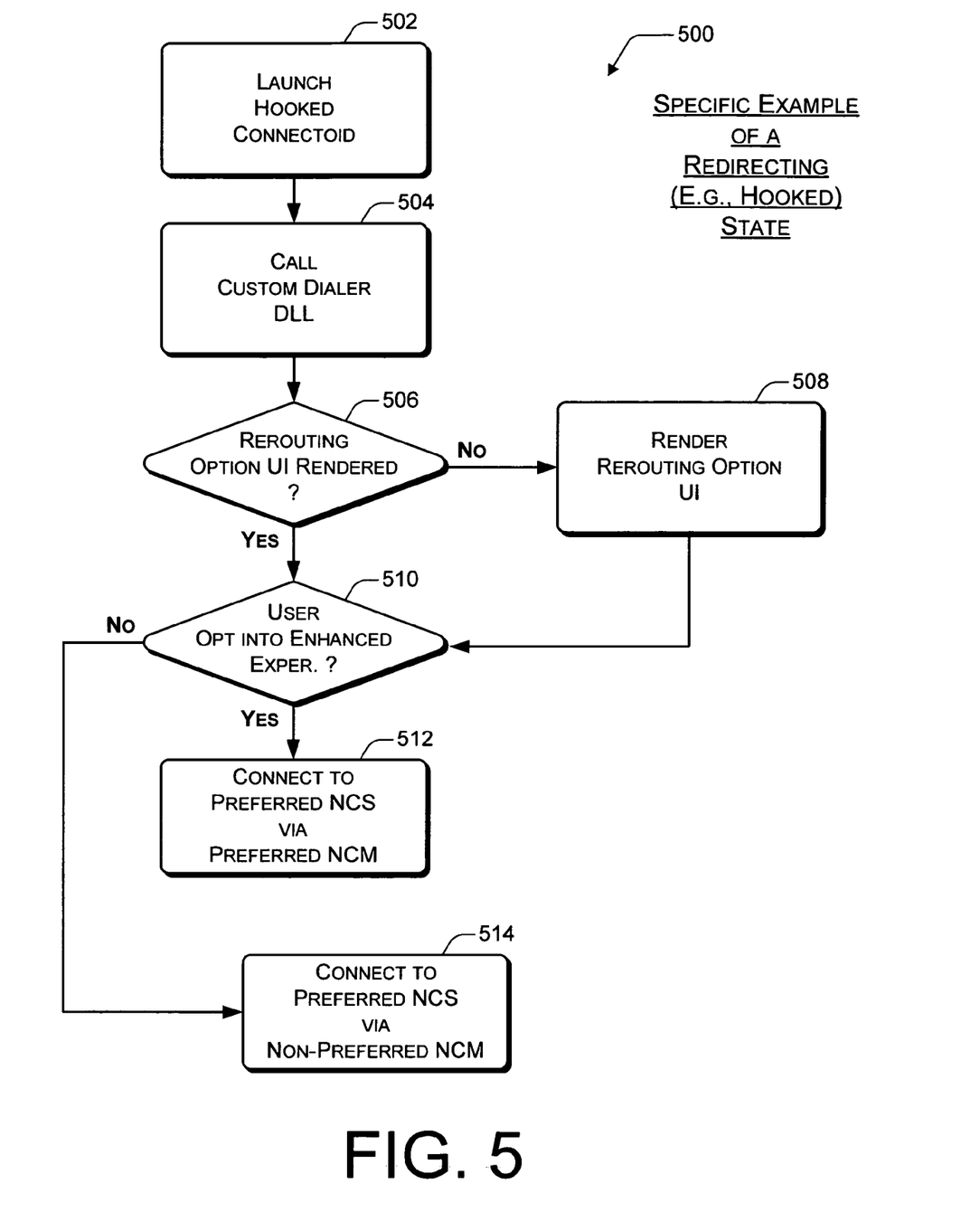
FIG. 5 is a flow diagram that illustrates a specific example of a method for a redirecting state of a management process.

FIG. 4 is a flow diagram 400 that illustrates a specific example of a method for a determining state of a management process. At block 402, a network connectivity manager is launched at session initiation. For example, a network connectivity manager may be started when a user signs into an operating system of a device.

At block 404, a RasEnumEntries API is called. In other words, an API that causes remote access entries to be enumerated is called. At block 406, it is checked whether any entries are found by the API. If not, then at block 408 the method of flow diagram 400 pauses for a sleep time. For example, the network connectivity manager may sleep for a predetermined interval. Afterwards, the network connectivity manager again calls the RasEnumEntries API (at block 404).

If, on the other hand, entries are found (at block 406), the network connectivity manager iterates through the entries at block 410. For example, the network connectivity manager may iterate through connection scenario entries 206 of network connectivity configuration information 114. At block 412, a RasGetEntryProperties API is called on the connectoid of each entry. In other words, an API that returns at least a portion of the remote access connection properties is called on each entry. In an example implementation, these connection properties include a username property such as "Name@ISP_Realm" (e.g., "John.Smith@msn" or "John.Smith@msn.com" [for the MSN® network of Internet services]).

At block 414, it is determined if a username property matches a preferred credential format. For example, it may be determined if the realm name of a username property matches the name of a preferred network connectivity service. If not, then the method of flow diagram 400 continues at block 410 and another entry is analyzed.

If, on the other hand, it is determined that the username property does match the preferred credential format, data corresponding to a preferred network connectivity service has been discovered at a connection scenario entry 206 of network connectivity configuration information 114. Although not illustrated in FIG. 4, this example assumes that the network connectivity module being used is non-preferred. Thus, at block 416, the connectoid having the matching username property is hooked into a preferred network connectivity module via a custom dialing option in the connectoid. Hence, in this example implementation, a redirection initiator 218 that is injected into a connection scenario entry 206 comprises a directive for the custom dialing option. An example of this hooked or redirecting state is described below with reference to FIG. 5.

FIG. 5 is a flow diagram 500 that illustrates a specific example of a method for a redirecting state of a management process. At block 502, the hooked connectoid is launched. For example, the connectoid having a directive for the custom dialing option may be launched.

At block 504, a custom dialer dynamic link library (DLL) is called. For example, a customer dialer DLL may be called prior to using the non-preferred network connectivity module as identified in the connectoid (e.g., by a software footprint).

At block 506, it is determined if a rerouting option UI has been previously rendered. If not, then at block 508 the rerouting option UI is rendered. The rerouting option UI provides a user an opportunity to elect to use a preferred network connectivity module for an enhanced connection experience instead of a non-preferred network connectivity module.

At block 510, it is confirmed if the user has opted into the enhanced experience of the preferred network connectivity module. In other words, it is confirmed whether the user has previously (either in response to block 508 or at another earlier time) elected to access the preferred network connectivity service via the preferred network connectivity module.

If the user has opted into the enhanced connection experience (as confirmed at block 510), at block 512 the connection is established to a network through the preferred network connectivity service via the preferred network connectivity module. If, on the other hand, the user has not opted into the enhanced connection experience, at block 514 the connection is established to a network through the preferred network connectivity service via the non-preferred network connectivity module.

The devices, actions, aspects, features, functions, procedures, modules, data structures, components, etc. of FIGS. 1-5 are illustrated in diagrams that are divided into multiple blocks. However, the order, interconnections, interrelationships, layout, etc. in which FIGS. 1-5 are described and/or shown is not intended to be construed as a limitation, and any number of the blocks can be modified, combined, rearranged, augmented, omitted, etc. in any manner to implement one or more systems, methods, devices, procedures, media, apparatuses, APIs, arrangements, etc. for network connectivity management. Furthermore, although the description herein includes references to specific implementations (including a general device of FIG. 6), the illustrated and/or described implementations can be implemented in any suitable hardware, software, firmware, or combination thereof and using any network connectivity module type(s), network interface technology(ies), organization(s) for network connectivity configuration information, API(s), and so forth.

Example Operation Environment for Computer or Other Device

Figure 6:
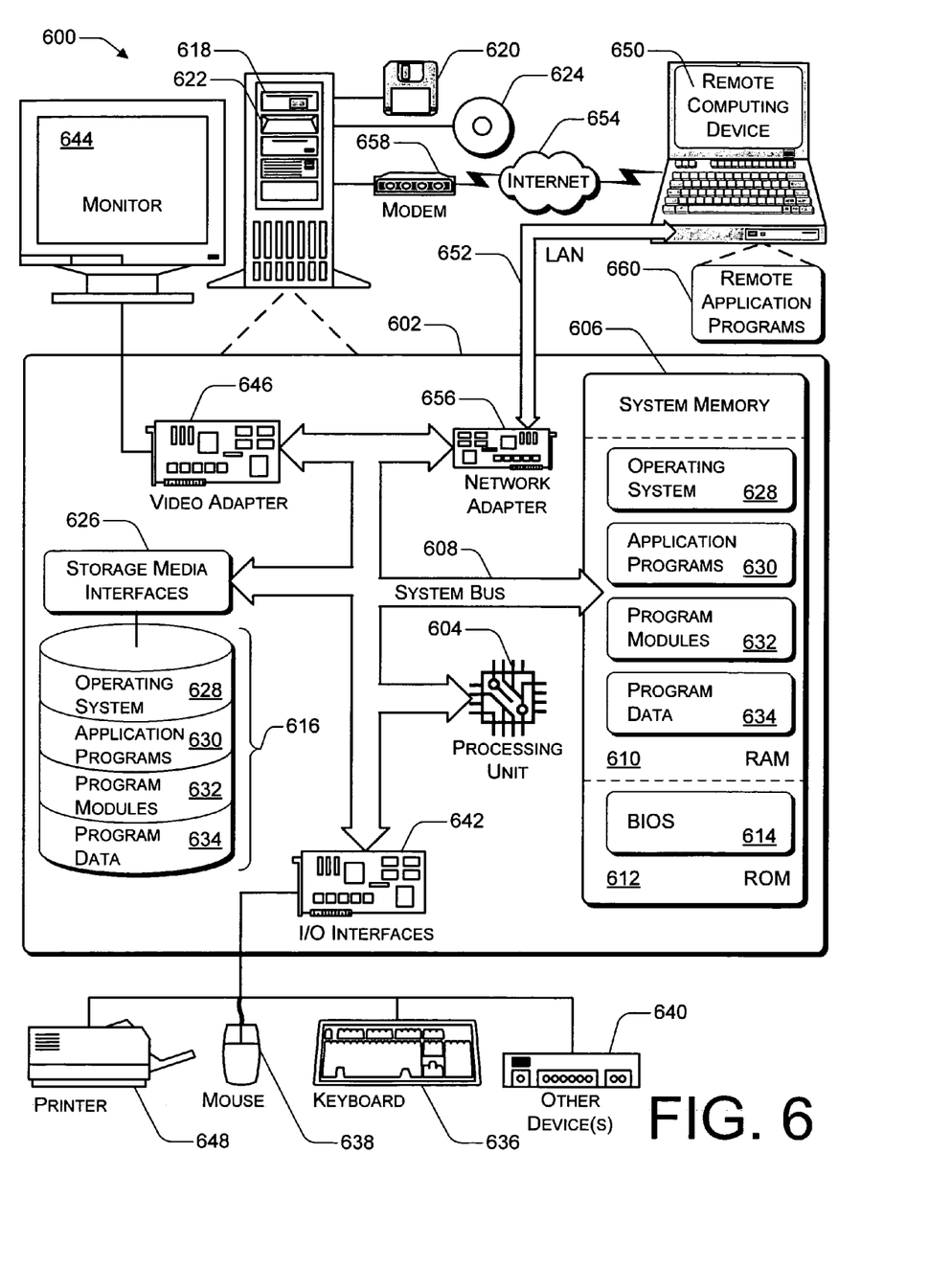
FIG. 6 illustrates an example of a computing (or general device) operating environment that is capable of (wholly or partially) implementing at least one aspect of network connectivity management as described herein.

FIG. 6 illustrates an example computing (or general device) operating environment 600 that is capable of (fully or partially) implementing at least one system, device, apparatus, component, arrangement, protocol, approach, method, procedure, media, API, some combination thereof, etc. for network connectivity management as described herein. Operating environment 600 may be utilized in the computer and network architectures described below.

Example operating environment 600 is only one example of an environment and is not intended to suggest any limitation as to the scope of use or functionality of the applicable device (including computer, network node, entertainment device, mobile appliance, general electronic device, etc.) architectures. Neither should operating environment 600 (or the devices thereof) be interpreted as having any dependency or requirement relating to any one or to any combination of components as illustrated in FIG. 6.

Additionally, implementations for network connectivity management may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for network connectivity management may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of network connectivity management, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media and executed by different processors.

Example operating environment 600 includes a general-purpose computing device in the form of a computer 602, which may comprise any (e.g., electronic) device with computing/processing capabilities. The components of computer 602 may include, but are not limited to, one or more processors or processing units 604, a system memory 606, and a system bus 608 that couples various system components including processor 604 to system memory 606.

Processors 604 are not limited by the materials from which they are formed or the processing mechanisms employed therein. For example, processors 604 may be comprised of semiconductor(s) and/or transistors (e.g., electronic integrated circuits (ICs)). In such a context, processor-executable instructions may be electronically-executable instructions. Alternatively, the mechanisms of or for processors 604, and thus of or for computer 602, may include, but are not limited to, quantum computing, optical computing, mechanical computing (e.g., using nanotechnology), and so forth.

System bus 608 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 602 typically includes a variety of processor-accessible media. Such media may be any available media that is accessible by computer 602 or another (e.g., electronic) device, and it includes both volatile and non-volatile media, removable and non-removable media, and storage media.

System memory 606 includes processor-accessible storage media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is typically stored in ROM 612. RAM 610 typically contains data and/or program modules/instructions that are immediately accessible to and/or being presently operated on by processing unit 604.

Computer 602 may also include other removable/non-removable and/or volatile/non-volatile storage media. By way of example, FIG. 6 illustrates a hard disk drive or disk drive array 616 for reading from and writing to a (typically) non-removable, non-volatile magnetic media (not separately shown); a magnetic disk drive 618 for reading from and writing to a (typically) removable, non-volatile magnetic disk 620 (e.g., a "floppy disk"); and an optical disk drive 622 for reading from and/or writing to a (typically) removable, non-volatile optical disk 624 such as a CD, DVD, or other optical media. Hard disk drive 616, magnetic disk drive 618, and optical disk drive 622 are each connected to system bus 608 by one or more storage media interfaces 626. Alternatively, hard disk drive 616, magnetic disk drive 618, and optical disk drive 622 may be connected to system bus 608 by one or more other separate or combined interfaces (not shown).

The disk drives and their associated processor-accessible media provide non-volatile storage of processor-executable instructions, such as data structures, program modules, and other data for computer 602. Although example computer 602 illustrates a hard disk 616, a removable magnetic disk 620, and a removable optical disk 624, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 600.

Any number of program modules (or other units or sets of processor-executable instructions) may be stored on hard disk 616, magnetic disk 620, optical disk 624, ROM 612, and/or RAM 610, including by way of general example, an operating system 628, one or more application programs 630, other program modules 632, and program data 634. These processor-executable instructions may include, for example, one or more of: a network connectivity manager 104, a network connectivity determiner 106, a network connectivity redirector 108, a network connectivity configuration scanner 202, an inharmonious connectivity module detector 204, a network connectivity module, network connectivity configuration information 114 and connection scenario entries 206 thereof, some combination thereof, and so forth.

A user may enter commands and/or information into computer 602 via input devices such as a keyboard 636 and a pointing device 638 (e.g., a "mouse"). Other input devices 640 (not shown specifically) may include a microphone, joystick, game pad, satellite dish, serial port, video camera, scanner, and/or the like. These and other input devices are connected to processing unit 604 via input/output interfaces 642 that are coupled to system bus 608. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 644 or other type of display device may also be connected to system bus 608 via an interface, such as a video adapter 646. Video adapter 646 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 644, other output peripheral devices may include components such as speakers (not shown) and a printer 648, which may be connected to computer 602 via input/output interfaces 642.

Computer 602 may operate in a networked environment using logical connections to one or more remote computers, such as a remote computing device 650. By way of example, remote computing device 650 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 650 is illustrated as a portable computer that may include many or all of the elements and features described herein with respect to computer 602.

Logical connections between computer 602 and remote computer 650 are depicted as a local area network (LAN) 652 and a general wide area network (WAN) 654. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereon and so forth.

When implemented in a LAN networking environment, computer 602 is usually connected to LAN 652 via a network interface or adapter 656. When implemented in a WAN networking environment, computer 602 typically includes a modem 658 or other component for establishing communications over WAN 654. Modem 658, which may be internal or external to computer 602, may be connected to system bus 608 via input/output interfaces 642 or any other appropriate mechanism(s). It is to be appreciated that the illustrated network connections are examples and that other manners for establishing communication link(s) between computers 602 and 650 may be employed.

In a networked environment, such as that illustrated with operating environment 600, program modules or other instructions that are depicted relative to computer 602, or portions thereof, may be fully or partially stored in a remote media storage device. By way of example, remote application programs 660 reside on a memory component of remote computer 650 but may be usable or otherwise accessible via computer 602. Also, for purposes of illustration, application programs 630 and other processor-executable instructions such as operating system 628 are illustrated herein as discrete blocks, but it is recognized that such programs, components, and other instructions reside at various times in different storage components of computing device 602 (and/or remote computing device 650) and are executed by processor(s) 604 of computer 602 (and/or those of remote computing device 650).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A method comprising:
   detecting for a connection scenario a mismatch between a preferred network connectivity service and a non-preferred network connectivity module, wherein the preferred network connectivity service comprises an internet service provider (ISP) and wherein the non-preferred network connectivity module is not preferred over a preferred network connectivity module when connecting to the ISP;
   responsive to the detected mismatch, redirecting the connection scenario away from the non-preferred network connectivity module, wherein the non-preferred network connectivity module comprises (i) an outdated version of a previous preferred network connectivity module or (ii) a third party network connectivity module from an operating system and/or independent vendor;
   scanning network connectivity configuration information including multiple connection scenarios;
   searching in the multiple connection scenarios of the network connectivity configuration information for data corresponding to the preferred network connectivity service;
   if data corresponding to the preferred network connectivity service is discovered in the connection scenario, extracting a footprint of a network connectivity module that is currently used for the connection scenario; wherein the footprint of the network connectivity module is utilized in the detecting, and
   injecting a redirection initiator into an entry for the connection scenario in the network connectivity configuration information, wherein at least a portion of the method is implemented in hardware.

2. The method as recited in claim 1, wherein the redirecting comprises at least one of:
   rerouting the connection scenario without user input to connect via the preferred network connectivity module that is associated with the preferred network connectivity service; or
   providing a user an option to elect to reroute the connection scenario to connect via the preferred network connectivity module.

3. The method as recited in claim 1, wherein the scanning of the network connectivity configuration information is proactively repeated at predetermined intervals.

4. One or more processor-accessible storage media comprising processor-executable instructions that, when executed, direct a device to perform actions comprising:
   scanning connection scenario entries of network connectivity configuration information;
   searching in each scanned connection scenario entry for data corresponding to a preferred network connectivity service; and
   if data corresponding to the preferred network connectivity service is discovered in a particular connection scenario entry,
      extracting a footprint of a network connectivity module used in conjunction with the preferred network connectivity service;
      detecting if the network connectivity module matches the preferred network connectivity service; and
      if the network connectivity module is not detected to match the preferred network connectivity service,
         injecting a redirection initiator into the particular connection scenario entry;
         wherein the network connectivity module comprises dial-up networking connectivity software, and the preferred network connectivity service comprises an internet service provider (ISP).

5. The one or more processor-accessible storage media as recited in claim 4, comprising the processor-executable instructions that, when executed, direct the device to perform further actions comprising:
   determining if a rerouting option user interface (UI) has been previously rendered;

if the rerouting option UI is determined to have not been previously rendered, then rendering the rerouting option UI;

confirming if a user has opted into rerouting a connection via a preferred network connectivity module;

if the user is not confirmed to have opted into the rerouting, establishing a connection through the preferred network connectivity service via a non-preferred network connectivity module; and     if the user is confirmed to have opted into the rerouting, establishing a connection through the preferred network connectivity service via a preferred network connectivity module.

6. The one or more processor-accessible storage media as recited in claim 4, wherein the action of detecting comprises an action of detecting if the network connectivity module as identified by the extracted footprint is a preferred network connectivity module that is associated with the preferred network connectivity service.

* * * * *